Nov. 30, 1965 M. DE VRIES 3,221,110

STEREO TRANSDUCER WITH INTERCHANGEABLE STYLUS HOLDERS

Filed July 21, 1961

3 Sheets-Sheet 1

INVENTOR.
Machiel de Vries
BY
Fisher, Christen + Goodson

Nov. 30, 1965 M. DE VRIES 3,221,110

STEREO TRANSDUCER WITH INTERCHANGEABLE STYLUS HOLDERS

Filed July 21, 1961 3 Sheets-Sheet 2

INVENTOR.
Machiel de Vries
BY
Fisher, Christen & Goodson

Nov. 30, 1965 M. DE VRIES 3,221,110

STEREO TRANSDUCER WITH INTERCHANGEABLE STYLUS HOLDERS

Filed July 21, 1961

3 Sheets-Sheet 3

INVENTOR
Machiel de Vries
BY
Fisher, Christen & Goodson

United States Patent Office 3,221,110

Patented Nov. 30, 1965

3,221,110

STEREO TRANSDUCER WITH INTERCHANGEABLE STYLUS HOLDERS

Machiel de Vries, Amsterdam, Netherlands, assignor to Ronette Piezo Electrische Industrie, N.V., Amsterdam, Netherlands, a corporation of the Netherlands Filed July 21, 1961, Ser. No. 125,869
Claims priority, application Netherlands, Aug. 13, 1960, 254,864
16 Claims. (Cl. 179—100.41)

The present invention relates to a transducer for use both in pick-ups and in track cutting means, said transducer comprising a housing accommodating two electro-acoustic transducing elements and being intended for use in reproducing and in cutting sound recordings, more particularly stereophonic sound recordings, in the faces of a groove provided in a record, which faces enclose an angle with each other, said transducer being provided with a stylus holder carrying a stylus, which stylus holder bears against the adjoining driven portions of said transducing elements.

In a transducer of this type, which hereinafter for simplicity's sake will be referred to as being embodied in a pick-up, although anything described hereinafter with reference to the pick-up is likewise applicable to a track cutting means, it is mostly desirable that various styli admit of being used, each having a point of a different radius.

Pick-ups provided with two or more stylus holders each carrying a stylus are known. All of said stylus holders are always connected then, mostly by means of a coupling member, with the transducing element or elements. In principle it is not an advantage if also an inoperative stylus holder is connected with the transducing element or elements to which vibrations are supplied. In order to limit the drawbacks of this construction certain measures must be taken, for example, by giving the coupling members a special design. In pick-ups of the type meant above which are characterized in that the stylus holder loosely bears against the driving portions the transducing elements, it is possible to obtain a construction in which only the operative stylus holder is connected with the transducing elements.

Another advantage of the construction according to the invention is that the inoperative stylus holder is entirely enclosed by the housing, so that there is no risk of said stylus holder being damaged.

According to the invention the pick-up is characterized by a second stylus carrying stylus holder, by each stylus holder being mounted for movement along a fixed path and each path leading from the inoperative position to the operative position of the associated stylus holder, by a common operating member for the two stylus holders, said operating member being movable in two directions, said stylus holders being so coupled that when the operating member is moved in either of the two directions one stylus holder is always moved to its inoperative position and the other stylus holder to its operative position, and by each stylus holder in its operative position having its stylus carrying end projecting from said housing through one and the same opening in said housing, the inoperative position of each stylus holder being within said housing.

For elucidating the invention various embodiments of the pick-up according to the invention will be described with reference to the accompanying drawings, in which.

Figures 5, 6, 7, 8, 9, 10:
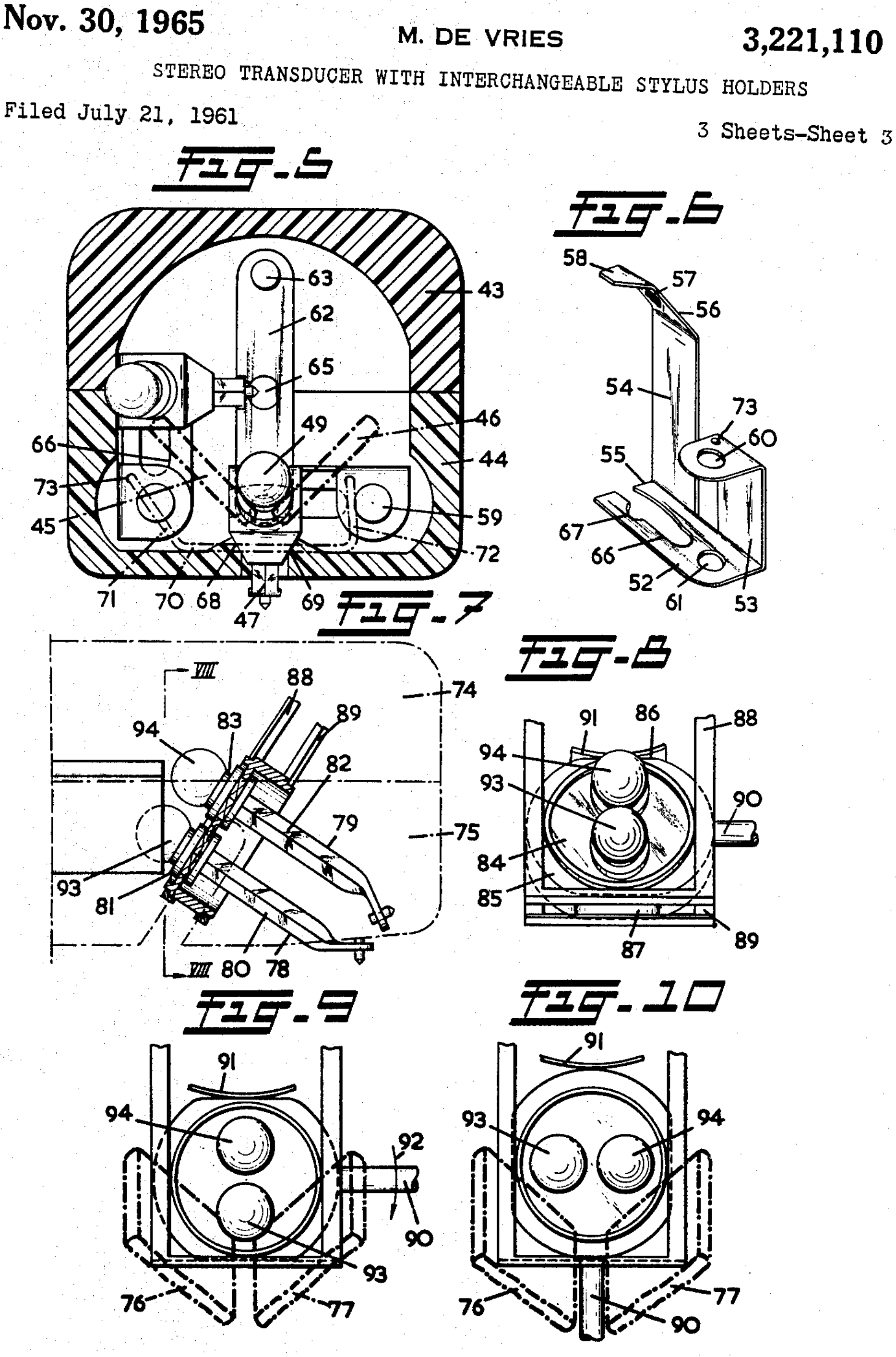
FIG. 5 is a similar section as the one shown in FIGURE 4, in which, however, the stylus holders are shown in another position.
FIG. 6 is a detail drawing of a clip for carrying a stylus holder.
FIG. 7 shows a portion of a third embodiment, again in vertical section according to a plane parallel to the longitudinal axes of the transducing elements.
FIG. 8 is an elevation according to the section VIII—VIII in FIG. 7.

FIGS. 9 and 10 relate to elevations like the one shown in FIG. 8, but more particularly show the relationship of the two stylus holders relative to the transducing elements, FIG. 9 showing one of the stylus holders bearing against the transducing elements, while FIG. 10 shows the two stylus holders in a position in which they are clear of the transducing elements.

Figure 2:
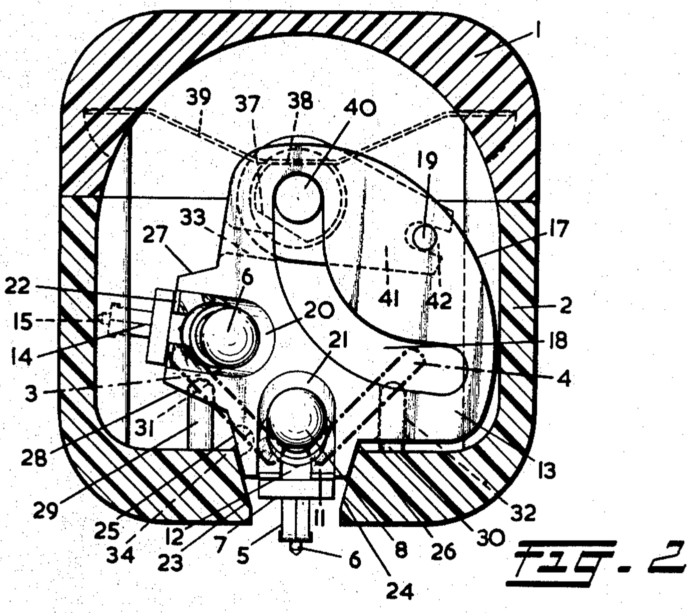
FIG. 2 is a vertical section on line II—II in FIGURE 1.
Figure 1:
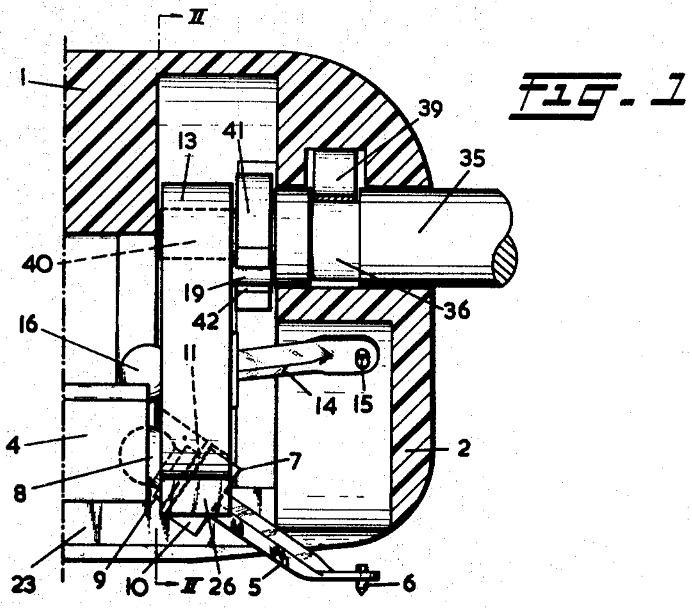
FIG. 1 is a vertical section of a portion of a pick-up parallel to the longitudinal direction of the transducing elements.

The transducer shown in FIGURES 1 and 2 comprises a casing including an upper portion 1 and a lower portion 2 in which two piezo-electric transducing elements 3 and 4 are accommodated. The ends (not shown) of the transducing elements are clampingly secured in the portion of the housing which has likewise not been shown. The portions of the transducing elements that are shown in FIGURE 1 are unsupported and may be driven by a stylus holder. The pick-up according to this embodiment comprises two stylus holders each including a shank and a bearing cap. The stylus holder which in FIGURE 1 is shown in the operative position comprises a shank 5 carrying a stylus 6 as well as a bearing cap 7. Said bearing cap has a longitudinal cavity in which the shank 5 is inserted. The bearing cap comprises various parts, to wit a knob-shaped portion 8 intended to bear against the transducing elements and two collars 9 and 10 located on either side of a carrying plate 11. A slot 12 is provided in said carrying plate 11, in which slot a neck connecting the collars 9 and 10 fits. The carrying plate 11 forms part of a disc 13 to be discussed hereinafter. The bearing cap 7 is made of a visco-elastic synthetic material, so that the shank 5 is adapted to move in all transverse directions under the influence of vibrations picked up by the stylus 6. However the shank 5 cannot move in its longitudinal direction and cannot twist about its longitudinal direction either. This last is due to the fact that the internal longitudinal cavity in the bearing cap 7 is formed complementary relative to the shank 5 which has a square cross section, the neck of the bearing cap 7 connecting the collars 9 and 10 being again so shaped that it cannot rotate in the slot 12 in the carrying plate 11.

The stylus holder which in FIGURE 1 is shown as being inoperative comprises a shank 14, a stylus 15 as well as a bearing cap, the knob-shaped portion of which is designated by 16. The disc 13 supporting the two stylus holders comprises a substantially flat plate, the circumferential shape of which may be seen from FIGURE 2. The disc 13 has a curved upper portion 17 adapted to co-operate with the inner wall of the portions 1 and 2 of the housing. An arcuate slot 18 is provided in the disc 13. Against the one side of disc 13 a short pin 19 is provided, by means of which the disc 13 can be moved. In the lower portion of the disc 13 the material has been removed in two places, namely at 20 and 21, in order to form accommodations for the stylus holders. The material of the disc 13 has been so removed that only a thin plate has been left, which is located in a plane that is oblique relative to the main faces of the disc 13. One of said plates has already been discussed hereinbefore and is designated by the reference numeral 11. The other plate is designated by 22. On either side of the accommodations for the stylus holders the disc 13 has a somewhat conical configuration so as to be guided to fit an accommodation for said conical portion in the portion 2 of the housing. Said accommodation is formed by the downwardly converging walls 23 and 24, the tapering portion of the stylus holder which in FIG. 2 is in the operative position being bounded by the faces 25 and 26.

The stylus holder which in FIG. 2 is in the inoperative position is supported by another tapering portion of disc 13, which tapering portion is bounded by the faces 27 and 28. On the horizontal portion of the inner wall of the portion 2 of the housing there are two vertically upwardly directed pins 29 and 30. Said pins serve as means for directing disc 13. Said disc 13 namely is adapted to be lowered into engagement with the pins 29 and 30, said pins either entering the set of recesses 31 and 32 or the set of recesses 33 and 34.

An operating shaft 35 projects from the housing of the pick-up and there carries an operating knob not shown. The portion 36 of shaft 35 has a slightly smaller diameter and moreover comprises two bevelled faces 37 and 38. A leaf spring 39 located in the portion 1 of the housing exerts a downward pressure on a narrowed portion 36, so that when said leaf spring comes into contact with one of the bevelled faces 37 and 38 during the rotation of the shaft 35 said contact makes itself felt as constituting the one final position of said shaft. The shaft 35 furthermore has a thinner portion 40 partly located in the slot 18, on which portion an eccentric cam 41 is secured. In the cam 41 a slot 42 is provided in which the pin 19 of the disc 13 fits. On rotation of shaft 35 the cam 41 rotates along, so that pin 19 and therefore also disc 13 are taken along. Disc 13 is then guided in the first place because the curved portion 17 slides along the inner wall of the housing and in the second place because the walls of the slot 18 slide along the rotating portion 40 of the shaft, which portion for the rest is stationary.

Furthermore disc 13 is naturally also guided by the pins 29 and 30, although it be only over a short distance. Upon a rotation of the shaft portion 40 as seen in FIG. 2 in a counter clock-wise direction cam 41 will rotate in the same direction, while pin 19 initially moves substantially straight up. Also the disc 13 admits of moving upwardly over a short distance, which is due to the shape of the various guide means mentioned. The stylus holder which is in the operative position and which comprises the shank 5 and the bearing cap 7 is naturally also taken along in upward direction when the disc 13 performs the movement described i.e., also in vertical direction, so that therefore the shank 5 disappears in upward direction through the opening in the bottom of the housing portion 2. When the faces 25 and 26 have disengaged the faces 23 and 24 and if the recesses 31 and 32 have disengaged the pins 29 and 30 the position of the disc 13 which is still driven by means of the pin 19, is furthermore solely determined by the cooperation between the shaft portion 40 and the slot 18 as well as by the curved portion 17 of the disc and the inner wall of the housing 1, 2. The co-operation between these elements is such that after moving vertically upwardly the disc 13 subsequently makes a rotary movement which, as seen in FIG. 2, is counter clockwise. The stylus holder which in FIG. 2 is shown in the inoperative position has then come in a downwardly directed position, while the stylus holder which in FIG. 2 is in the operative position is then located within the housing and is directed sideways to the right. When the shaft 35 is further rotated in the same direction disc 13 starts descending in a vertical direction and the faces 27 and 28 will then come to rest between the walls 23 and 24, whilst furthermore the recesses 33 and 34 will engage pins 29 and 30. Ultimately a position is reached which is the mirror image of the position as shown in FIG. 2. Spring 39 then no longer bears on the bevelled portion 38 but on the bevelled portion 37.

Now the embodiments according to FIGURES 3–6 will be discussed.

Figure 3:
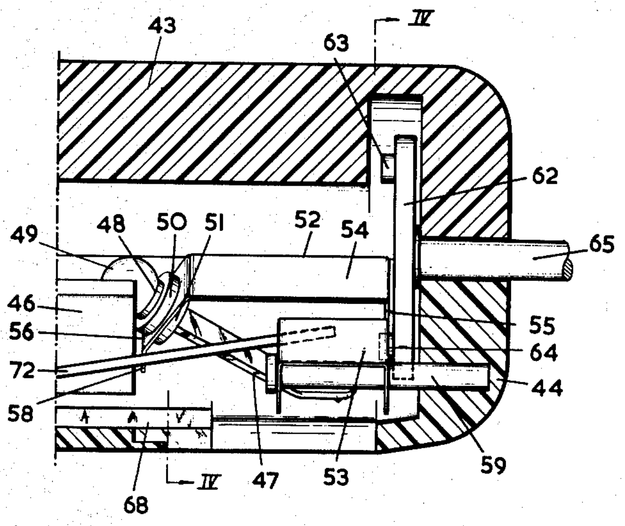
FIG. 3 is a vertical section parallel to the longitudinal direction of the transducing elements of a portion of a pick-up according to a second embodiment.
Figure 4:
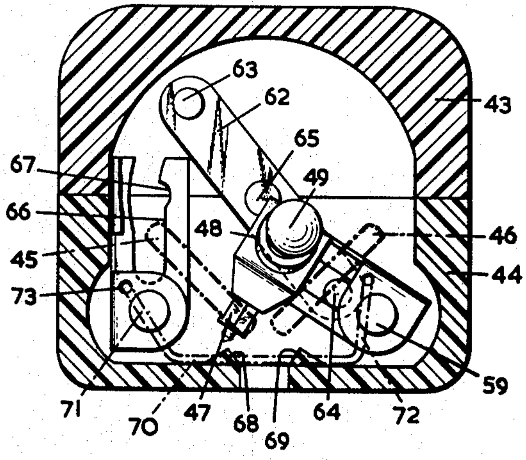
FIG. 4 is a vertical section on line IV—IV in FIGURE 3.

The housing again comprises two portions 43 and 44 and accommodates two piezo-electric transducing elements 45 and 46. In FIGURES 3 and 4 only one stylus holder has been shown for clearness' sake, but as also appears from FIG. 5 there are naturally again two stylus holders. The stylus holder in FIGURES 4 and 5 comprises a shank 47 and a bearing cap which has been generally designated by the numeral 48. The bearing cap 48 again comprises a knob-shaped portion 49 and two collars 50 and 51. For supporting the stylus holder 47, 48 a supporting clip is provided which is generally designated by the numeral 52. Said clip 52 comprises two legs 53 and 54 and a web 55. Leg 54 has a bent portion 56 provided with an opening 57 and furthermore a tapering lip 58. The bearing cap 48 is so mounted in the opening 57 that its collars 50 and 51 are located on either side of the bent portion 56. The supporting clip 52 is secured in the housing portion 44 by means of a pin 59 passing through the openings 60 and 61 and secured in the wall of the housing portion 44. Pin 59 forms a pivot for the supporting clip 52. For making clip 52, as well as naturally also the other supporting clip, pivot strip 62 is provided which carries two pins 63 and 64. The strip 62 is supported and can also be turned by means of a shaft 65 which shaft extends from the casing and is provided with an operating knob (not shown). In the body 55 of the supporting clip 52 a slot 66 is provided which has an accommodation 67 formed therein. The pin 64 fits in slot 66. On rotation of the shaft 65 the pin 64 is located within the slot 66, so that the supporting clip 52 is rotated about pin 59. If in FIGURES 3 and 4 stylus holder 47, 48 moves towards its operative position this is effected by a rotation of the shaft 65 which as seen in FIG. 4 has a clock-wise direction. The strip 62 then moves from the oblique position shown in FIG. 4 to the vertical position shown in FIG. 5.

In the operative position of the stylus holder 47, 48 as shown in FIG. 5 the conical lip 58 bears against the faces 68 and 69 of and fits in the passage in the bottom side of the housing. When the vertical position of strip 62 according to FIG. 5 has been reached pin 64 just located in the lateral accommodation 67, so that undesirable movements of the stylus holder in the operative position are prevented.

As generally only one of the two pins 63 and 64 at a time contacts a supporting clip generally also only one stylus holder will be moved at a time. Assuming that in FIG. 4 the stylus holder 47, 48 moves downwardly towards its operative position, the other stylus holder during the entirely downward movement of the stylus holder 47, 48 remains in the inoperative position as shown in FIG. 5. During the return movement, so starting from the position as shown in FIG. 5, the stylus holder 47, 48 will first turn upwardly through an angle of 90° till it has reached its inoperative position, while only then the stylus holder which in FIG. 5 is shown in the inoperative position starts moving downwards to its operative position. Consequently there is a position in which the two supporting clips with the web and the longitudinal slot provided therein point vertically upward. The pins 63 and 64 are then each located just within the entrance to the associated longitudinal slot.

In order to fix the stylus holder which is in the inoperative position there is provided a substantially U-shaped spring 70 having two legs 71 and 72. Leg 72 reaches with its end through an opening 73 of the supporting clip 52. The other leg 71 is secured in a similar manner to the other supporting clip. The spring 70 is so shaped that its legs 71 and 72 always urge the two supporting clips away from each other, or in other words it biasses each supporting clip towards its inoperative position. If a stylus holder is moved towards its operative position by shaft 65 being turned, the associated leg of the spring 70 is moved in oppositon to said spring. This has for its result that the other leg of the spring exerts an additional force for keeping its associated supporting clip in the inoperative position.

A third embodiment of the transducer according to the invention will now be described to the reference to FIGURES 7 to 10 inclusive.

In these more schematic figures the two housing halves are shown in dash-dot lines designated by the numerals 74 and 75. The transducing elements are designated by the numerals 76 and 77. The stylus holders are generally designated by the numerals 78 and 79. The stylus holder 78 comprises a shank 80 and a bearing cap 81. The stylus holder 79 comprises a shank 82 and a bearing cap 83. The bearing caps 81 and 83 are inserted in openings in the bottom 84 of drum 85 which in general has a cylindrical shape. This cylindrical drum, however, is flattened at 86 and 87. The drum 85 is surrounded by a frame comprising two portions 88 and 89, which portions are spaced apart and which are secured in a manner not shown in the housing of the pick-up. The drum 85 carries an operating rod 90 which through a slot (not shown) in the housing portion 75 projects from said housing and is provided with an operating knob (not shown). The drum 85 is adapted to be rotated between the frame portions 88 and 89 by means of rod 90. During such a rotation of the drum 85 about its axis said drum in addition to a rotary movement will also perform a translatory movement, this owing to the fact that the drum 85 comprises the two flattened portions 86 and 87 and a cylindrical portion. A leaf spring 91 secured in the housing always biasses the drum 85 toward the lower end of the frame 88, 89. If one of the flattened portions 86 or 87 bears on the lower side of the frame 88, 89 also one of the knob-shaped portions 93 and 94 bears against the transducer elements and one of the stylus holders is located in the operative position. When the operating rod 90 is moved according to the arrow 92 in FIGURE 9 drum 85 will move slightly upwardly because the cylindrical portion of drum 85 starts co-operating then with the inner side of frame 88, 89. This may be seen in FIGURE 10.

Upon a rotation according to the arrow 92 the knob-shaped portion 93 of the bearing cap 81 resting against the transducing elements 76 and 77 will be lifted and thus become clear of said transducing elements. The stylus holders may then freely rotate relative to the transducing elements until the other knob-shaped projection 94 of cap 83 has come down. This knob-shaped portion 94 then in its turn will bear against the transducing elements 76 and 77, because meanwhile the other flattened portion 86 has come to bear against the inner side of the lower part of the frame.

I claim:

1. In a binaural transducer means for use in reproducing or recording sound, including a housing means, two electro-acoustical transducing elements, each having a mounting portion and a driven portion, said mounting portions being attached to the housing means to position the driven portions closely adjacent each other, a pair of elongated stylus holders, each having a laterally projecting stylus at one end and having a driving portion at the other end for simultaneous operative engagement with the driven portions of both said transducer elements, and support means for said stylus holders movable with respect to said housing means, said support means including means to selectively and concurrently shift each of said stylus holders bodily alternatively between an operative position and an inoperative position, each stylus holder when in operative position having its respective stylus adapted to engage a recording surface and its driving portion engaged with the driven portions of both said transducer elements, and when in inoperative position having its driving portion disengaged from said driven portions.

2. The invention as defined in claim 1, wherein the driven portions of said transducing elements comprise a pair of generally flat closely spaced convergent surfaces, and each of the driving portions of said stylus holders comprise an enlarged portion disposed at the respective ends thereof.

3. The invention as defined in claim 1, wherein said movable support means includes a generally plate-shaped member and means to impart translatory movement to the member in its own plane and to rotate the member about an axis normal to its own plane, said of stylus holders being fixed to said plate member.

4. The invention as defined in claim 3, wherein said plate-shaped member is provided with a pair of spaced peripherally arranged projections and said housing means ies provided with a recessed portion to alternatively receive said projections.

5. The invention as defined in claim 3, wherein said plate-shaped member is provided with an arcuate slot, and said movable support means includes a pin member supported by the housing means and extending through said slot to define the path of movement of the plate member.

6. The invention as defined in claim 5, wherein said movable support means also includes an arm rotatable about an axis of said pin member, the extremity of the arm being pivotally connected to said plate-shaped member.

7. The invention as defined in claim 6, wherein said plate-shaped member is provided with a pair of spaced peripherally arranged projections and said housing means is provided with a recessed portion to alternatively receive said projections.

8. The invention as defined in claim 3, wherein said movable support means includes a pair of spaced parallel members attached to said housing means joined by a transverse member, and said plate-shaped member is generally circular with a pair of angularly shaped flat peripheral surfaces for alternative engagement with the surfaces of the transverse member, and biassing means to urge said engagement.

9. The invention as defined in claim 8, wherein said parallel members are respectively provided with inwardly directed channels to slidably receive said plate member.

10. In transducer means for use in reproducing or recording sound, including a housing means, at least one electro-acoustic transducing means comprising an elongated flat strip of electrostrictive material, one end of the strip being supported by the housing means, a pair of elongated stylus holders, each having a stylus at one end and having a driving portion at the other end, and movble mounting means for said pair of stylus holders, said mounting means including an element rotatable with respect to said transducing means about an axis generally parallel with the principal axis of said strip of electrostrictive material to shift the stylus holders selectively into and out of operative position, each stylus holder when in operative position having its driving portion in abutting engagement with a portion of the flat surface of the electrostrictive material remote from said one end.

11. The invention as defined in claim 10, wherein the driving portions of each stylus holder comprises a generally ball-shaped portion composed of yieldable material, and biassing means is provided to urge said ball-shaped portion into said engagement with the flat surface of said electrostrictive material.

12. The invention as defined in claim 10, wherein said mounting means includes a pair of elements each supporting a stylus holder rotatable about parallel axes generally parallel with the principal axis of said strip of electrostrictive material.

13. The invention as defined in claim 12, wherein an operating lever is rotatably attached to the housing to selectively engage said pair of elements to move said stylus holders into and out of operative position.

14. The invention as defined in claim 13, wherein said operating lever projects laterally in opposite directions from its axis of rotation and is provided with a pin at each extremity extending parallel with said axis of rotation, and each of said pair of elements supporting the stylus holders include a laterally projecting member having a longitudinally extending slot for selectively slidable and rotatable engagement with a respective one of said pins.

15. In transducer means for use in reproducing or recording sound, including housing means having a hollow interior, at least one electro-acoustic transducing means fixedly mounted within the housing means having a mounting portion attached to the housing means and a driven portion, a pair of elongated stylus holders each having a stylus formed at the forward end for engagement with a recording surface and a driving portion for detachable engagement with the driven portion of the electro-acoustic transducing means, said housing means having an opening through which alternatively the forward end of one of the stylus holders projects when in engagement with a recording surface, and mounting means in the housing means for said pair of stylus holders, said mounting means being shiftable with respect to said transducing means to selectively engage one or the other of the driving portions of the stylus holders with the driven portion of the electro-acoustic transducing means, and to concurrently position the forward end of the stylus holder not so engaged within the housing means.

16. The invention as defined in claim 15, wherein shiftable mounting means is provided an operating lever projecting exteriorly of the housing means through a suitable opening provided therein.

References Cited by the Examiner

UNITED STATES PATENTS

| | | | |
|---|---|---|---|
| 2,570,578 | 10/1951 | Martin | 179—100.41 |
| 2,809,842 | 10/1957 | Mueller | 274—36 |
| 2,816,056 | 12/1957 | Harris | 179—100.41 |
| 2,988,366 | 6/1961 | Hansen | 274—36 |

IRVING L. SRAGOW, *Primary Examiner.*

ELI J. SAX, *Examiner.*

UNITED STATES PATENT OFFICE

CERTIFICATE OF CORRECTION

Patent No. 3,221,110 November 30, 1965

Machiel de Vries

It is hereby certified that error appears in the above numbered patent requiring correction and that the said Letters Patent should read as corrected below.

Column 5, line 63, for "electro-acoustical" read -- electro-acoustic --; column 6, line 17, after "said" insert -- pair --; line 22, for "ies" read -- is --; lines 45 and 46, for "the surfaces" read -- the surface --; column 7, line 21, strike out "formed".

Signed and sealed this 25th day of October 1966.

(SEAL)
Attest:

ERNEST W. SWIDER
Attesting Officer

EDWARD J. BRENNER
Commissioner of Patents